US011232549B2

(12) United States Patent
Narasimha-Iyer

(10) Patent No.: US 11,232,549 B2
(45) Date of Patent: Jan. 25, 2022

(54) ADAPTING A QUALITY THRESHOLD FOR A FINGERPRINT IMAGE

(71) Applicant: InvenSense, Inc., San Jose, CA (US)

(72) Inventor: Harihar Narasimha-Iyer, Livermore, CA (US)

(73) Assignee: InvenSense, Inc., San Jose, CA (US)

(*) Notice: Subject to any disclaimer, the term of this patent is extended or adjusted under 35 U.S.C. 154(b) by 87 days.

(21) Appl. No.: 16/550,041

(22) Filed: Aug. 23, 2019

(65) Prior Publication Data

US 2021/0056673 A1    Feb. 25, 2021

(51) Int. Cl.
| G06T 7/00 | (2017.01) |
| G06K 9/00 | (2006.01) |
| G06K 9/03 | (2006.01) |

(52) U.S. Cl.
CPC ........ *G06T 7/0002* (2013.01); *G06K 9/00087* (2013.01); *G06K 9/036* (2013.01); *G06T 2207/30168* (2013.01)

(58) Field of Classification Search
CPC ........ G06T 7/0002; G06T 2207/30168; G06K 9/00087; G06K 9/036; G06F 21/31; G06F 21/32; G06Q 20/40; G06Q 50/265
USPC ................. 382/124, 141, 209, 218
See application file for complete search history.

(56) References Cited

U.S. PATENT DOCUMENTS

| 4,880,012 A | 11/1989 | Sato |
| 5,575,286 A | 11/1996 | Weng et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |

(Continued)

FOREIGN PATENT DOCUMENTS

| CN | 1826631 A | 8/2006 |
| CN | 101192644 A | 6/2008 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Daniel G Mariam

(57) ABSTRACT

In a method for adapting a quality threshold for a fingerprint image, a fingerprint image is received. An image quality of the fingerprint image is determined. Provided the image quality of the fingerprint image does not satisfy a quality threshold, the quality threshold is decreased. Provided the image quality of the fingerprint image does satisfy a decreased quality threshold, the fingerprint image is forwarded to a matcher for fingerprint authentication.

19 Claims, 11 Drawing Sheets

(56) References Cited

U.S. PATENT DOCUMENTS

| | | |
|---|---|---|
| 7,109,642 B2 | 9/2006 | Scott |
| 7,243,547 B2 | 7/2007 | Cobianu et al. |
| 7,257,241 B2 * | 8/2007 | Lo .................. G06K 9/00087 |
| | | 382/124 |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 * | 12/2009 | Cho ..................... G07C 9/37 |
| | | 382/124 |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 * | 8/2012 | Li .......................... G06F 21/32 |
| | | 713/186 |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,322,929 B2 | 6/2019 | Pandian et al. |
| 10,387,704 B2 | 8/2019 | Dagan et al. |
| 10,461,124 B2 | 10/2019 | Berger et al. |
| 10,478,858 B2 | 11/2019 | Lasiter et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0230605 A1 | 10/2006 | Schlote-Holubek et al. |
| 2006/0280346 A1 | 12/2006 | Machida |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095347 A1 | 4/2012 | Adam et al. |
| 2012/0147698 A1 | 6/2012 | Wong et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 * | 10/2014 | Harding .................. G07C 9/37 |
| | | 340/5.52 |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |

(56) References Cited

U.S. PATENT DOCUMENTS

| | | |
|---|---|---|
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004352 A1 | 1/2017 | Jonsson et al. |
| 2017/0330552 A1 | 1/2017 | Garlepp et al. |
| 2017/0032485 A1* | 2/2017 | Vemury ............... G06Q 50/265 |
| 2017/0059380 A1 | 3/2017 | Li et al. |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0178251 A1 | 6/2018 | Foncellino et al. |
| 2018/0206820 A1 | 7/2018 | Anand et al. |
| 2018/0225495 A1 | 8/2018 | Jonsson et al. |
| 2018/0229267 A1 | 8/2018 | Ono et al. |
| 2018/0276443 A1 | 9/2018 | Strohmann et al. |
| 2018/0329560 A1 | 11/2018 | Kim et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0046263 A1 | 2/2019 | Hayashida et al. |
| 2019/0057267 A1 | 2/2019 | Kitchens et al. |
| 2019/0073507 A1 | 3/2019 | D'Souza et al. |
| 2019/0087632 A1 | 3/2019 | Raguin et al. |
| 2019/0095015 A1 | 3/2019 | Han et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0210666 A1 | 7/2020 | Flament |
| 2020/0285882 A1 | 9/2020 | Skovgaard Christensen et al. |
| 2020/0302140 A1 | 9/2020 | Lu et al. |

FOREIGN PATENT DOCUMENTS

| | | |
|---|---|---|
| CN | 102159334 A | 8/2011 |
| CN | 105264542 A | 1/2016 |
| CN | 105378756 A | 3/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011040467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |
| WO | 2018148332 A1 | 8/2018 |
| WO | 2019164721 A1 | 8/2019 |

OTHER PUBLICATIONS

ISA/EP, Partial International Search Report for International Application No. PCT/US2019/034032, 8 pages, dated Sep. 12, 2019, 8.

"ISA/EP, International Search Report and Written Opinion for International Application # PCT/US2018/063431, pp. 1-15, dated Feb. 5, 2019 (Feb. 5, 2019))".

"ISA/EP, International Search Report and Written Opinion for International Application # PCT/US2019/015020, pp. 1-23, dated Jul. 1, 2019".

(56) References Cited

OTHER PUBLICATIONS

"ISA/EP, International Search Report and Written Opinion for International Application # PCT/US2019/023440, pp. 1-10, dated Jun. 4, 2019".

"ISA/EP, International Search Report and Written Opinion for International Application No. PCT/US2017/031120, 12 pages, dated Aug. 29, 2017 (Aug. 29, 2017)".

"ISA/EP, International Search Report and Written Opinion for International Application No. PCT/US2017/031127, 13 pages, dated Sep. 1, 2017".

"ISA/EP, International Search Report and Written Opinion for International Application No. PCT/US2017/031134, 12 pages, dated Aug. 30, 2017 (Aug. 30, 2017)".

"ISA/EP, International Search Report and Written Opinion for International Application No. PCT/US2017/031140, 18 pages, dated Nov. 2, 2017 (Nov. 2, 2017)".

"ISA/EP, International Search Report and Written Opinion for International Application No. PCT/US2017/031421 13 pages, dated Jun. 21, 2017 (Jun. 21, 2017)".

"ISA/EP, International Search Report and Written Opinion for International Application No. PCT/US2017/031426 13 pages, dated Jun. 22, 2017 (Jun. 22, 2017)".

"ISA/EP, International Search Report and Written Opinion for International Application No. PCT/US2017/031431, 14 pages, dated Aug. 1, 2017 (Aug. 1, 2017)".

"ISA/EP, International Search Report and Written Opinion for International Application No. PCT/US2017/031434, 13 pages, dated Jun. 26, 2017 (Jun. 26, 2017)".

"ISA/EP, International Search Report and Written Opinion for International Application No. PCT/US2017/031439, 10 pages, dated Jun. 20, 2017 (Jun. 20, 2017)".

"ISA/EP, International Search Report and Written Opinion for International Application No. PCT/US2017/031824, 18 pages, dated Sep. 22, 2017 (Sep. 22, 2017)".

"ISA/EP, International Search Report and Written Opinion for International Application No. PCT/US2017/031827, 16 pages, dated Aug. 1, 2017 (Aug. 1, 2017)".

"ISA/EP, International Search Report and Written Opinion for International Application No. PCT/US2017/031831, 12 pages, dated Jul. 21, 2017 (Jul. 21, 2017)".

"ISA/EP, International Search Report and Written Opinion for International Application No. PCT/US2018/037364, 10 pages, dated Sep. 3, 2018".

"ISA/EP, International Search Report and Written Opinion for International Application No. PCT/US2020/033854, 16 pages, dated Nov. 3, 2020".

"ISA/EP, International Search Report and Written Opinion for International Application No. PCT/US2020/039208, 10 pages, dated Oct. 9, 2020".

"ISA/EP, International Search Report and Written Opinion for International Application No. PCT/US2020/039452, 11 pages, dated Sep. 9, 2020".

"ISA/EP, International Search Report and Written Opinion for International Application No. PCT/US2020/042427, 18 pages, dated Dec. 14, 2020".

"ISA/EP, International Search Report for International Application No. PCT/US2017/031826, 16 pages, dated Feb. 27, 2018 (Feb. 27, 2018))".

"ISA/EP, Partial International Search Report for International Application No. PCT/US2017/031140, 13 pages, dated Aug. 29, 2017 (Aug. 29, 2017)".

"ISA/EP, Partial International Search Report for International Application No. PCT/US2017/031823, 12 pages, dated Nov. 30, 2017 (Nov. 30, 2017)".

"ISA/EP, Partial Search Report and Provisional Opinion for International Application No. PCT/US2020/042427, 13 pages, dated Oct. 26, 2020".

"ISA/EP, Partial Search Report for International Application No. PCT/US2020/033854, 10 pages, dated Sep. 8, 2020".

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.

"Office Action for CN App No. 201780029016.7 dated Mar. 24, 2020, 7 pages".

"Office Action for CN App No. 201780029016.7 dated Sep. 25, 2020, 7 pages".

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Helio P10 cpu; Published on Apr. 20, 2016; https://www.youtube.com/watch?v=ncNCbpkGQzU (Year: 2016)".

Cappelli, et al., "Fingerprint Image Reconstruction from Standard Templates", IEEE Transactions On Pattern Analysis and Machine Intelligence, IEEE Computer Society, vol. 29, No. 9, Sep. 2007, 1489-1503.

Feng, et al., "Fingerprint Reconstruction: From Minutiae to Phase", IEEE Transactions On Pattern Analysis and Machine Intelligence, IEEE Computer Society, vol. 33, No. 2, Feb. 2011, 209-223.

Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.

Kumar, et al., "Towards Contactless, Low-Cost and Accurate 3D Fingerprint Identification", IEEE Transactions On Pattern Analysis and Machine Intelligence, IEEE Computer Society, vol. 37, No. 3, Mar. 2015, 681-696.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.

Ross, et al., "From Template to Image: Reconstructing Fingerprints from Minutiae Points", IEEE Transactions On Pattern Analysis and Machine Intelligence, IEEE Computer Society, vol. 29, No. 4, Apr. 2007, 544-560.

Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.

Tang, et al., "11.2 3D Ultrasonic Fingerprint Sensor-on-a-Chip", 2016 IEEE International Solid-State Circuits Conference, IEEE, Jan. 31, 2016, 202-203.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Zhou, et al., "Partial Fingerprint Reconstruction with Improved Smooth Extension", Network and System Security, Springer Berlin Heidelberg, Jun. 3, 2013, 756-762.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

(56) References Cited

OTHER PUBLICATIONS

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hoperoft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12, Retrieved from Internet: http://scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

ISA/EP, International Search Report and Written Opinion for International Application No. PCT/US2019061516, 14 pages, dated Mar. 12, 2020.

ISA/EP, International Search Report and Written Opinion for International Application No. PCT/US2021/021412, 12 pages, dated Jun. 9, 2021.

Taiwan Application No. 106114623, 1st Office Action, dated Aug. 5, 2021, pp. 1-8.

EP Office Action, for Application 17724184.1, dated Oct. 12, 2021, 6 pages.

EP Office Action, dated Oct. 9, 2021, 6 pages.

European Patent Office, Office Action, App 17725018, pp. 5, dated Oct. 25, 2021.

European Patent Office, Office Action, App 17725020.6, pp. 4, dated Oct. 25, 2021.

Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

\* cited by examiner

ADAPTING A QUALITY THRESHOLD FOR A FINGERPRINT IMAGE

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
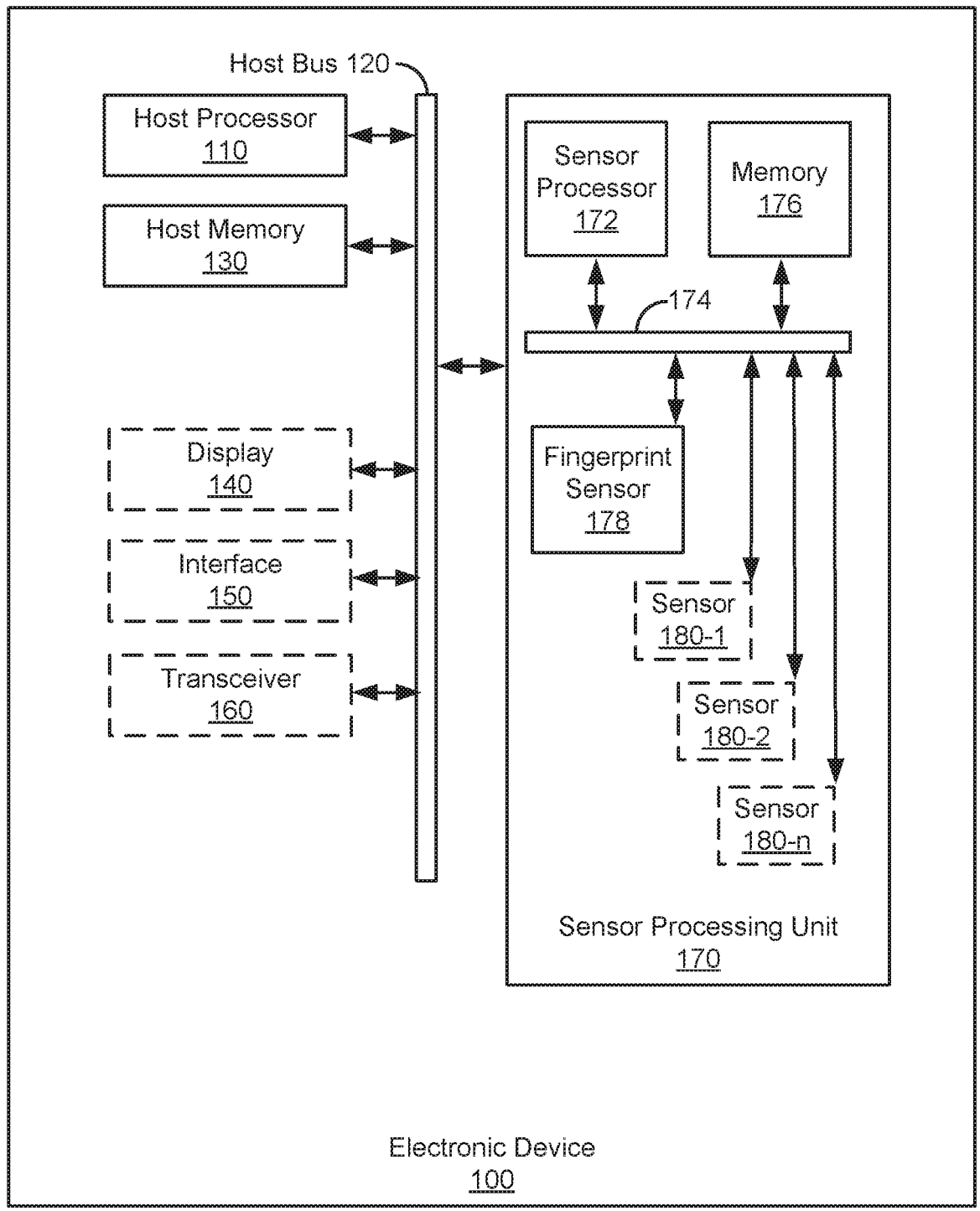
FIG. 1 illustrates a block diagram of an example mobile electronic device upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "decreasing," "increasing," "forwarding," "changing," "capturing," "resetting," "monitoring," detecting," "using," "adapting," or the like, refer to the actions and processes of an electronic device such as an electrical circuit.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example electronic device with which or upon which various embodiments described herein may be implemented. Different types of adaptation of the quality threshold after the description of the example electronic device. Examples of a short term adaptation of the quality threshold are then described. Examples of long term adaptation of a quality threshold according to environmental factors are then described. Examples of long term adaptation of a quality threshold based on monitoring fingerprint image quality are then described.

Fingerprint sensors, in accordance with the described embodiments, are used for capturing fingerprint images that are used for performing fingerprint authentication at a matcher. A matcher compares a fingerprint image to at least one stored fingerprint image (e.g., image acquired during enrollment of the user) and authenticates the user of the sensor based on the comparison. In order for the matcher to provide accurate results, the fingerprint image must be of sufficient quality. For example, the fingerprint image should exhibit a correct ridge/valley pattern, ridge connectedness, be of sufficient contrast, and/or have a high contrast-to-noise (CNR) ratio.

Embodiments described herein perform an image quality check on the captured fingerprint image prior to forwarding the fingerprint image to the matcher. The image quality check confirms that the fingerprint image is of sufficient quality to send to the matcher. For example, the image quality check may also act as a filter to ensure that non-fingerprint images (e.g., void images) do not get forwarded to the matcher. In some embodiments, the image quality of the captured fingerprint image is compared against a quality threshold. If the fingerprint image satisfies the quality threshold (e.g., the quality of the fingerprint image is higher than the quality threshold), the fingerprint image is forwarded to the matcher. If the fingerprint image does not satisfy the quality threshold (e.g., the quality of the fingerprint image is not higher than the quality threshold), the fingerprint image is not forwarded to the matcher.

Selection and setting of a quality threshold is an important determination in fingerprint image authentication. Forwarding non-fingerprint images or low-quality images to the matcher, which have a low likelihood of authentication, use unnecessary system resources. For example, they may wake-up the processor performing the matching from a low-power mode unnecessary. If the quality threshold is a high value, only high-quality images are forwarded to the matcher, and as a results, if the user of the sensor is an authenticated user, there is a high confidence of the matcher authenticating the user. However, some fingerprint images may not satisfy the quality threshold, and if these fingerprint images are forwarded to the matcher, the matcher may not be able to confirm authentication due to the low quality, resulting in an incorrect refusal of the user, also referred to as a false reject. Therefore, a low quality threshold may lead to a high false reject ratio (FRR) and is disadvantageous as authentication of a user is incorrectly denied. The inverse condition may also occur, such that if the quality threshold is a low value, confidence in the results of the matcher can degrade, as incorrect fingerprint images may be accepted resulting in a high false accept ratio (FAR). A high FAR is disadvantageous as user authentication may be improperly granted, resulting in security concerns. Therefore, adapting and setting the correct quality threshold is important for user experience, use of resources, and for security aspects.

Image quality of a fingerprint image can vary as a result of environmental conditions that impact the appearance of the fingerprint. For example, cold and dry condition can decrease the quality of a fingerprint image, as the appearance of the fingerprint may be degraded. In another example, moist or wet conditions can also decrease the quality of the fingerprint image.

Embodiments described herein provide adaptation of the quality threshold for a fingerprint sensor to account for changes in quality of a user's fingerprints. In some embodiments, adaptation of the quality threshold is provided for a limited duration and is reset to an original (or other) value upon completion. Such embodiments are described herein as "short term" adaptation of the quality threshold. For example, a short term adaptation of a quality threshold may occur during an authentication session, such that upon completion of the authentication session, the quality threshold is reset to an original (or other) value upon completion of the authentication session. In other embodiments, adaptation of the quality threshold is provided without resetting the quality threshold value. Such embodiments are described herein as "long term" adaptation of the quality threshold. For example, a long term adaptation of a quality threshold may occur responsive to detecting a trend indicative of a change in fingerprint image quality, such as a change in season or a change in fingerprint quality over time. It should be appreciated that the short term adaptation and long term adaptation of a quality threshold can be used cooperatively. For example, a long term adaptation can adapt the original quality threshold value used in a short term adaptation, such that upon completion of the short term adaptation, the quality threshold is reset to the original quality threshold set by the long term adaptation.

In some embodiments, a short term adaptation of the quality threshold is provided, where the quality threshold is reset to an original (or other) value at completion of the adaptation operation. In such an embodiment, if a user fails to satisfy the quality threshold, the quality threshold is decreased, thereby increasing the likelihood of satisfying the quality threshold. In some embodiments, if a user fails to satisfy the quality threshold on successive attempts, the quality threshold is progressively decreased. In some embodiments, the quality threshold cannot be decreased below a minimum quality threshold. Once the fingerprint image satisfies a decreased quality threshold, the fingerprint image is forwarded to the matcher. In some embodiments, once the fingerprint image satisfies a decreased quality threshold, the quality threshold is reset to the initial value. An example of a short term adaptation of the quality threshold occurs during an authentication session, where upon completion of the adaptation of the quality threshold, the quality threshold is reset to an original (or other) value.

In some embodiments, a long term adaptation of the quality threshold is provided. Quality of a fingerprint image may change gradually over time (e.g., due to environmental factors or aging). For example, fingers may get dryer during winter months, resulting in lower image quality, with the image quality improving for the same fingers in summer months. In some embodiments, a change in an environmental factor is monitored, and the quality threshold is adapted according to the change in the environmental factor. In other embodiments, the quality of the fingerprint image for a user is monitored over time. Responsive to detecting a trend indicative of a change in fingerprint image quality, the quality threshold is adapted. It should be appreciated that the short term adaptation of the quality threshold can be used in conjunction with the long term adaptation of the quality threshold.

Example Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown).

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors used in the adaptation of a quality threshold. In one example, sensor 180-1 may comprise an acoustic sensor, sensor 180-2 may comprise a temperature sensor, and sensor 180-n may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. Although depicted as being included within SPU 170, one, some, or all of fingerprint sensor 178 and/or one or more sensors 180 may be disposed externally to SPU 170 in various embodiments.

Examples of Adaptation of a Quality Threshold for a Fingerprint Image

Figure 2:
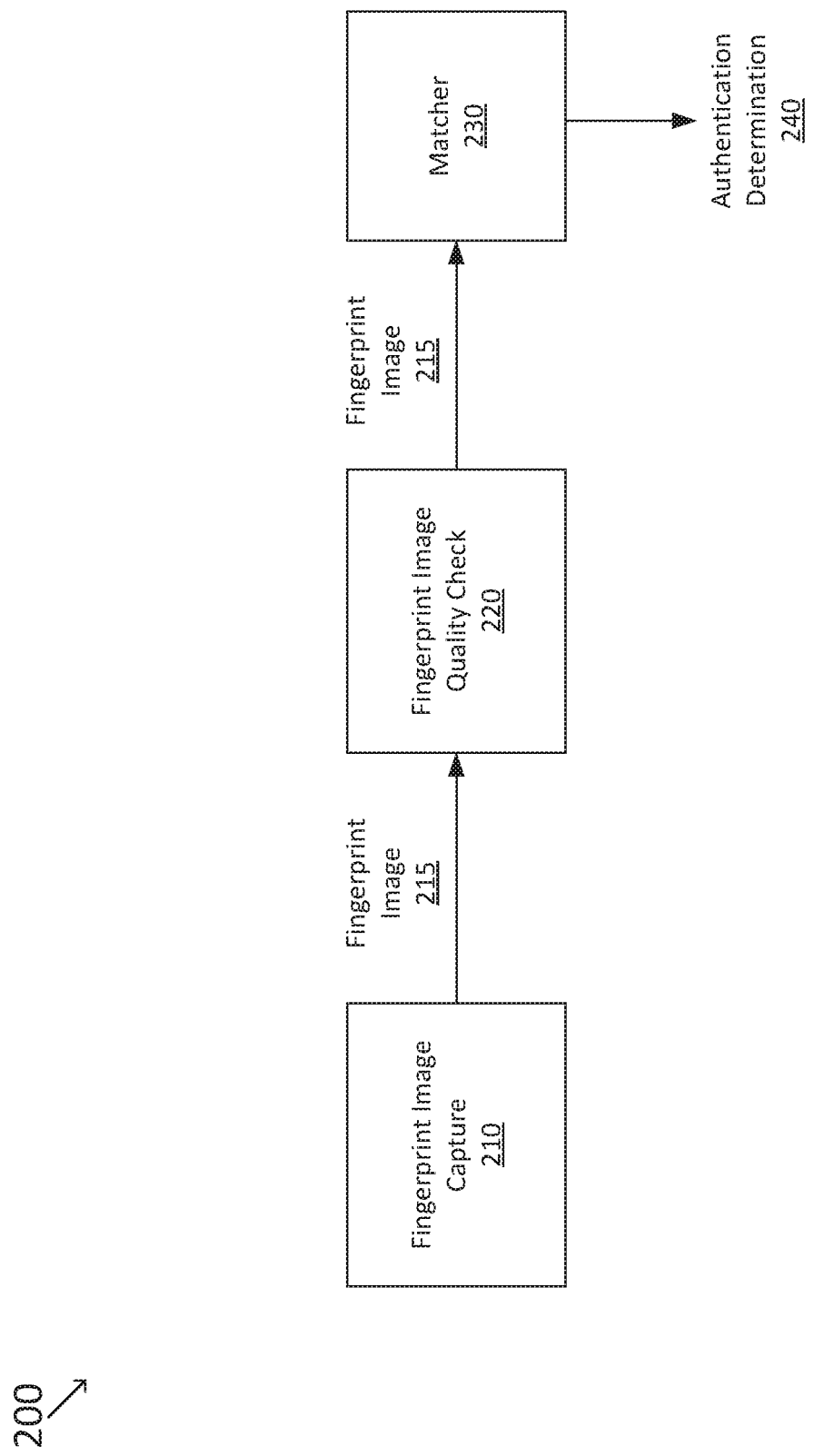
FIG. 2 illustrates a block diagram of an example fingerprint sensing system for performing a fingerprint image quality check, according to some embodiments.

FIG. 2 illustrates a block diagram of an example fingerprint sensing system 200 for performing a fingerprint image quality check, according to some embodiments. Fingerprint sensing system 200 is configured perform a quality check on a captured fingerprint image 215 prior to forwarding fingerprint image 215 to matcher 230. It should be appreciated that fingerprint sensing system 200 can be implemented as hardware, software, or any combination thereof. It should be appreciated that fingerprint image quality check 220 and fingerprint image capture 210 may be comprised within a single component, in accordance with some embodiments.

Fingerprint image 215 is captured at fingerprint image capture 210. It should be appreciated that fingerprint image capture 210 can be any type of image capture device, including without limitation, an ultrasonic sensor, an optical sensor, a camera, etc. Fingerprint image 215 is received at fingerprint image quality check 220, where a quality check is performed on fingerprint image 215. Fingerprint image quality check 220 confirms that the fingerprint image is of sufficient quality to send to matcher 230. For example, fingerprint image quality check 220 may also act as a filter to ensure that non-fingerprint images (e.g., void images) do not get forwarded to matcher 230. In some embodiments, the image quality of fingerprint image 220 is compared against a quality threshold. If fingerprint image 215 satisfies the quality threshold (e.g., the quality of fingerprint image 215 is higher than the quality threshold), fingerprint image 215 forwarded to matcher 230. If fingerprint image 215 does not satisfy the quality threshold (e.g., the quality of fingerprint image 215 is not higher than the quality threshold), fingerprint image 215 is not forwarded to matcher 230 for authentication.

Matcher 230 is configured to receive fingerprint image 215 and perform user authentication. Matcher 230 is the part of fingerprint sensing system 200 that compares fingerprint image 215 to at least one authentication fingerprint image (e.g., a fingerprint image acquired during enrollment of the user) and authenticates the user based on the comparison. Based on the comparison between fingerprint image 215 and at least one authentication image, matcher 230 outputs an authentication determination 240, e.g., fingerprint image 215 is authenticated or fingerprint image 215 is not authenticated. As used herein, enrollment refers to an operation where an authorized user inputs his/her fingerprint images into a fingerprint sensing system for later comparison during an authentication operation. In general, the higher the quality of fingerprint image 215, the higher the confidence of the authentication results. For example, fingerprint image 215 should exhibit ridge connectedness, be of sufficient contrast, and/or have a high CNR.

Figure 3:
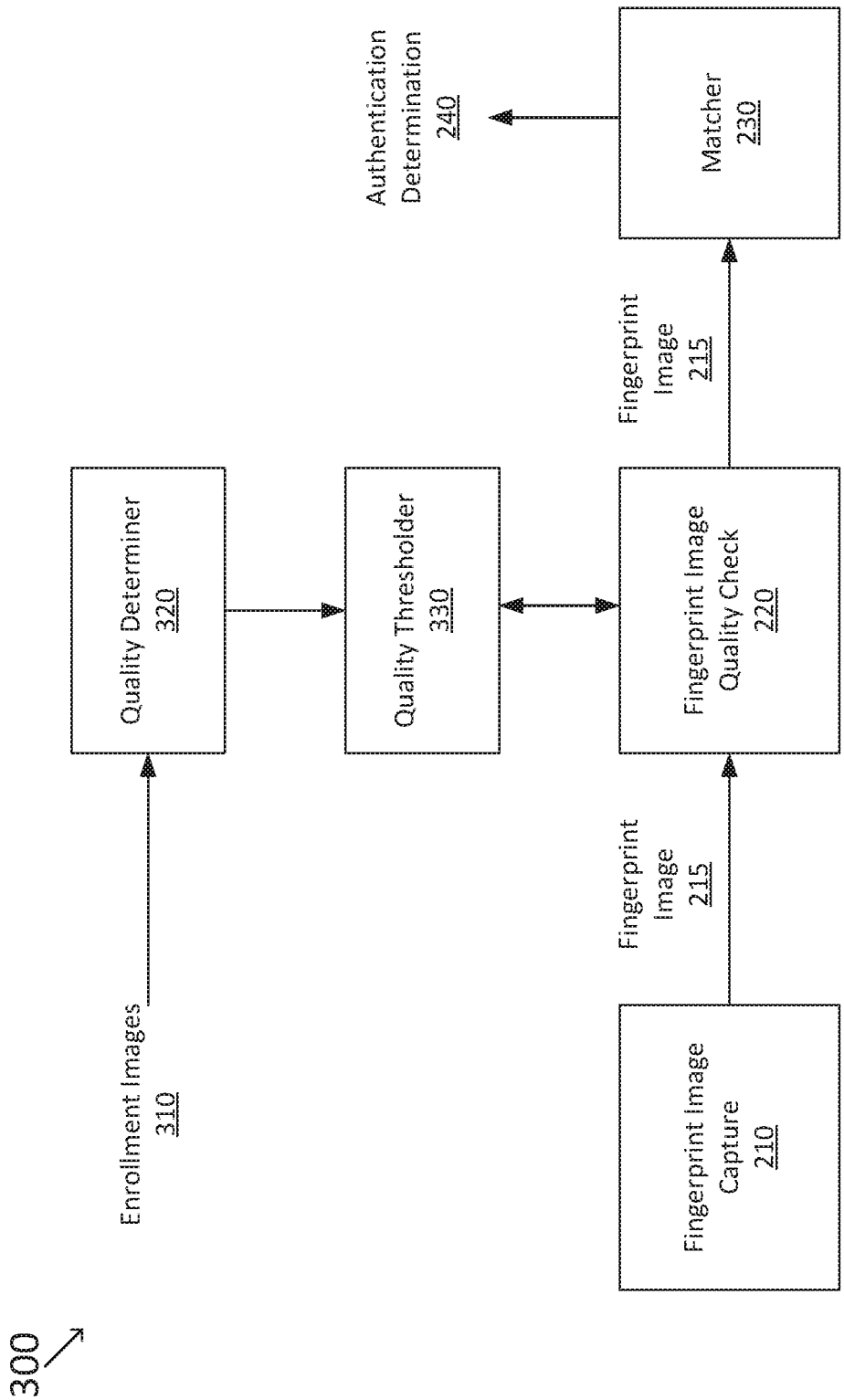
FIG. 3 illustrates a block diagram of an example system for determining a quality threshold, according to some embodiments.

FIG. 3 illustrates a block diagram of an example fingerprint sensing system 300 for determining a quality threshold, according to some embodiments. It should be appreciated that fingerprint sensing system 300 includes the components of fingerprint sensing system 200 of FIG. 2, and that like components operate in similar manner as described in accordance with the description of FIG. 2.

Fingerprint sensing system 300 includes quality determiner 320 for determining a quality of enrollment images 310. Enrollment images 310 include fingerprint images acquired during enrollment of a user and are used for comparison to fingerprint image 215 for authenticating the user of the sensor. Enrollment images 310 may also be referred to as the fingerprint templates, or templates. Enrollment images 310 are used as reference images for authentication. In some embodiments, these enrollment images 310 may be updated after enrollment, referred to herein as a dynamic update of the fingerprint templates.

In some embodiments, a quality threshold determination is made during or concurrent to an enrollment operation. During enrollment, quality determiner 320 determines a quality of enrollment images 310. Quality of an image is an indication of the condition of an image for purposes of matching. It should be appreciated that many factors can be included in a fingerprint image quality determination, including without limitation: ridge-connectedness, ridge distinctness, ridge continuity, image contrast, CNR, average gray-level, etc. Quality can be dependent on matcher 230, e.g., in consideration of features of the fingerprint such as pores. In some embodiments, the quality is a normalized value in the range of 0-100.

Quality determiner 320 forwards the quality for enrollment images to quality thresholder 330. Quality thresholder 330 determines a quality threshold based on the received qualities. For example, quality thresholder 330 may determine an average quality of enrollment images 310. In some embodiments, the quality threshold can be set as the average quality of enrollment images 310. In some embodiments, the quality threshold can be set as a percentage or fraction of the average quality of enrollment images 310 (e.g., 80% of the average quality). It should be appreciated that the setting of the quality threshold may also depend on the variation of the quality of the enrollment images. For example, a large variation in the quality of the images during enrollment may suggest that a lower quality threshold may provide better performance. It should be appreciated that an initial or default quality threshold can be set to any value, where it is generally desirable to optimize the FRR and FAR, which may depend on the user or device in consideration. In some embodiments, the quality threshold may not consider the quality of the enrollment images, and may set the threshold based on system and security consideration. The security consideration may depend on the application requesting the authentication. In some embodiments, the threshold may be a weighted average between the average quality of the enrollment image and a threshold based on system and security consideration.

Figure 4:
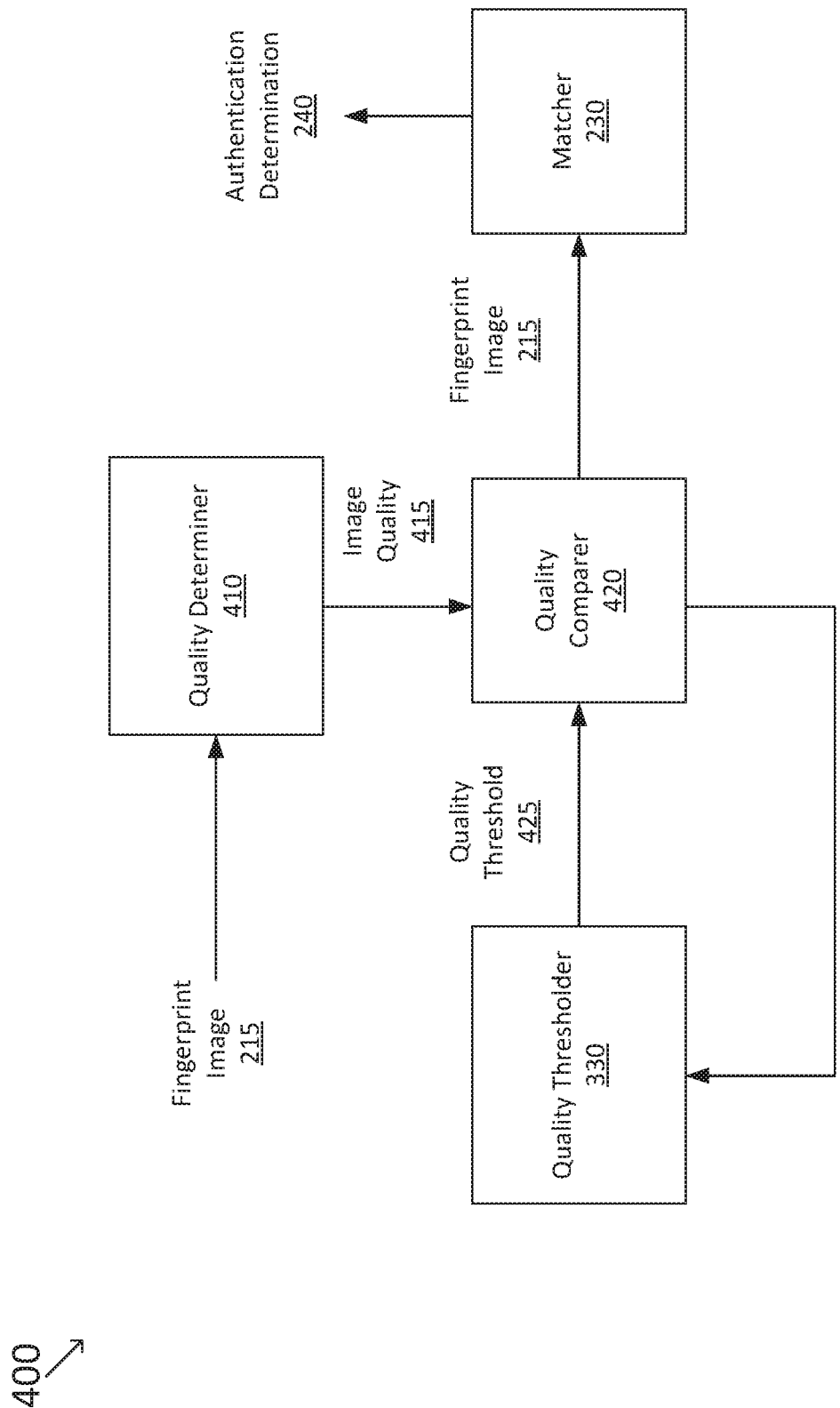
FIG. 4 illustrates a block diagram of an example system for performing short term adaptation of a quality threshold, according to some embodiments.

In accordance with various embodiments described herein, adaptation of the quality threshold for a fingerprint sensor is provided to account for changes in quality of a user's fingerprints. FIG. 4 illustrates a block diagram of an example system 400 for performing short term adaptation of a quality threshold, according to some embodiments. It should be appreciated that system 400 can be implemented within fingerprint image quality 220 and/or quality thresholder 330.

Fingerprint image 215 is received (e.g., from fingerprint image capture 210) at quality determiner 410, where image quality 415 of fingerprint image 215 is determined. It should be appreciated that quality determiner 410 utilizes a quality determiner procedure consistent with the determination of the quality thresholder (e.g., for determination of the quality of enrollment images 310). Quality determiner 410 forwards image quality 415 for fingerprint image 215 to quality comparer 420.

Quality comparer 420 receives image quality 415 for fingerprint image 215 and quality threshold 425 from quality thresholder 330. Quality comparer 420 compares image quality 415 to quality threshold 425. If image quality 415 satisfies quality threshold 425 (e.g., is not less than quality threshold 425), fingerprint image 215 is determined to pass the quality check, and fingerprint image 215 is forwarded to matcher 230 for outputting authentication determination 240. If image quality 415 does not satisfy quality threshold 425 (e.g., is less than quality threshold 425), fingerprint image 215 is determined to fail the quality check.

In some embodiments, if a user fails to satisfy the quality threshold, the quality threshold is decreased, thereby increasing the likelihood of satisfying the quality threshold. Quality comparer 420 transmits a notification to quality thresholder 330 to decrease quality threshold 425. It should be appreciated that quality thresholder 330 can use different means to decrease quality threshold 425, e.g., decrease by a set value, decrease by a percentage or fraction, etc. The decreased quality threshold 425 is received at quality comparer 420, where a comparison between image quality 415 and the reduced quality threshold 425 is performed.

In some embodiments, if fingerprint image 215 fails to satisfy the quality threshold on successive attempts, quality threshold 425 is progressively decreased. In some embodiments, quality threshold 425 cannot be decreased below a minimum quality threshold. If the minimum quality threshold is reached, the authentication process may be aborted, and a message may be sent to the system or user. The message may include suggestions/instructions for improve image quality during capture. Once fingerprint image 215 satisfies a decreased quality threshold 425, fingerprint image 215 is forwarded to matcher 230 for outputting authentication determination 240. In some embodiments, once fingerprint image 215 satisfies a decreased quality threshold 425, quality threshold 425 is reset to the initial value. In some embodiments, once fingerprint image 215 satisfies a decreased quality threshold 425, quality threshold 425 is partially reset to the initial value, the amount of reset may depend on the quality of the image.

In some embodiments, quality data is passed to matcher 230 for use in the fingerprint authentication. For example, where fingerprint image 215 fails to satisfy an initial quality threshold 425 and satisfies a reduced quality threshold 425, quality data is passed to matcher 230 for use in the fingerprint authentication by considering the reduced quality threshold 425 in an authentication operation. Different applications using the authentication provided by a fingerprint sensing system may have different security requirements. For example, banking or financial applications may have higher security requirements such that a decreased quality threshold may not satisfy the authentication requirement, or may allow satisfaction of a reduced quality threshold subject to a particular minimum reduced quality threshold. In such embodiments, the quality data includes information related to the reduced quality threshold, allowing the application to make a determination as to whether fingerprint image 215 is of sufficient quality to perform authentication. For example, the application can have a minimum quality threshold it is willing to accept for authentication purposes, and the quality data informs the application of the quality threshold used for authenticating the fingerprint image in determining whether to accept the authentication.

Figure 5:
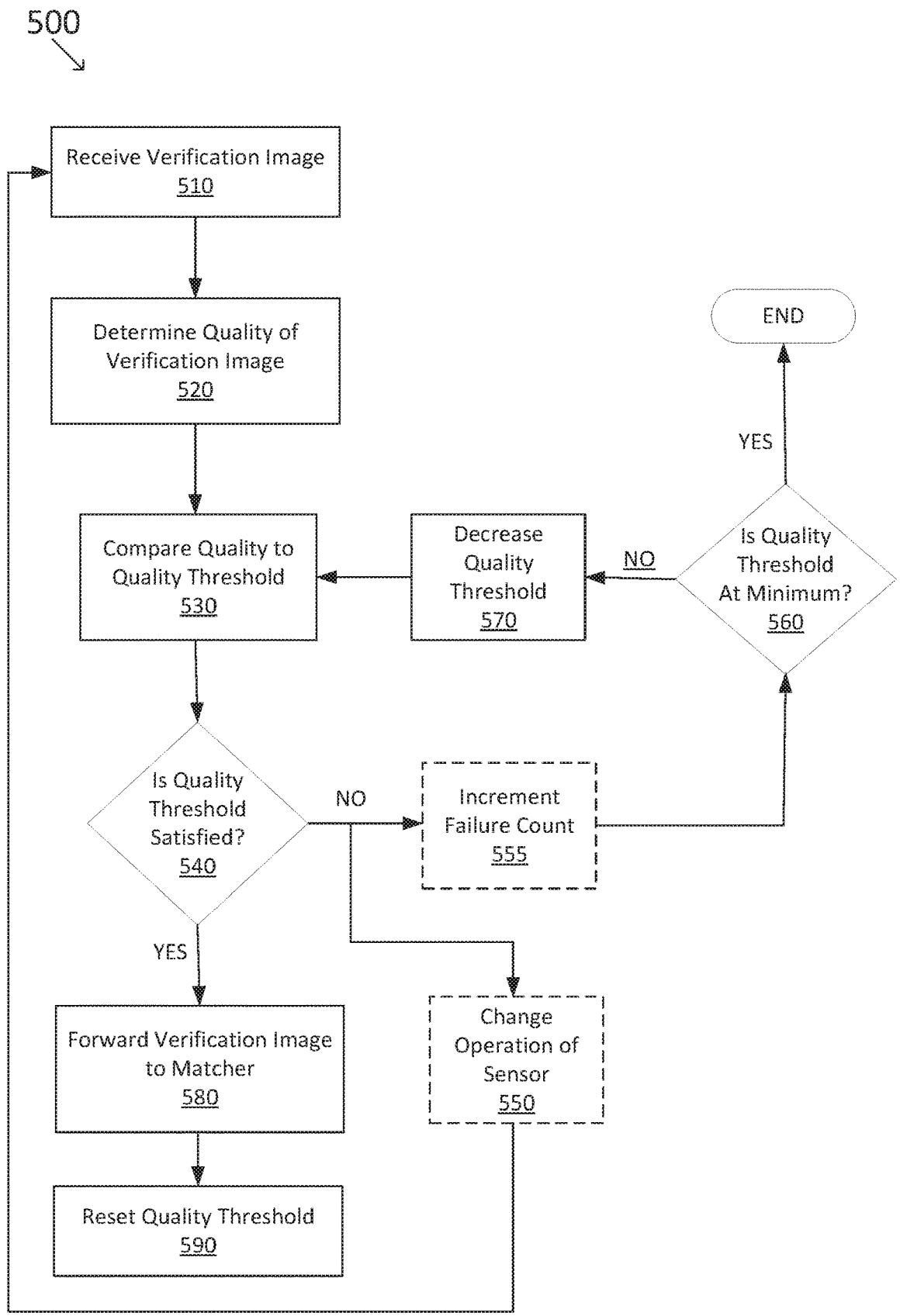
FIG. 5 illustrates an example data flow diagram of a short term adaptation of a quality threshold, according to some embodiments.

FIG. 5 illustrates a flow diagram 500 of an example method of a short term adaptation of a quality threshold, according to a first embodiment. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software. In some embodiments, flow diagram 500 is implemented within system 400 of FIG. 4.

At procedure 510 of flow diagram 500, a fingerprint image is received. In some embodiments, the fingerprint image is captured at a fingerprint sensor (e.g., an ultrasonic fingerprint sensor) associated with an electronic device. In some embodiments, the received fingerprint image is a previously captured fingerprint image that has undergone image processing to enhance the image quality (e.g., at procedure 550).

At procedure 520, an image quality of the fingerprint image is determined (e.g., at quality determiner 410). At procedure 530, the quality of the fingerprint image is compared to a quality threshold (e.g., at quality comparer 420). In one embodiment, the quality threshold is associated with an electronic device at which the fingerprint image was captured. In one embodiment, the quality threshold is associated with an application.

At procedure 540, it is determined whether the quality threshold is satisfied (e.g., the quality is not less than the quality threshold). If it is determined that the quality threshold is satisfied, as shown at procedure 580, the fingerprint image is forwarded to the matcher for authentication.

In one embodiment, if it is determined that the quality threshold is not satisfied, flow diagram 500 proceeds to procedure 550. At procedure 550, the operation of the fingerprint sensor for capturing the fingerprint image is changed. It should be appreciated that procedure 550 is optional. In some embodiments, a new fingerprint image is captured according to the changed operation. For example, the power to the fingerprint sensor can be increased, the gain of the fingerprint sensor can be increased, the beamforming operation of the fingerprint sensor can be changed, etc. In some embodiments, where the operation of the fingerprint sensor is changed, flow diagram 500 returns to procedure 510 where a new verification image is received. In some embodiments, procedure 550 includes performing image processing on the previously received fingerprint image to enhance the quality of the fingerprint image. For example, the image processing may reduce noise, increase contrast, smooth ridges, etc. In some embodiments, the verification image received at procedure 510 is a previously captured image to which the image processing was applied. In some embodiments, the new verification image is compared to a decreased quality threshold (e.g., according to procedures 560 and 570). In some embodiments, the iteration of capturing a new fingerprint images can be done at a high rate of multiple times per second (e.g. 1-30 Hz or higher). For instance, the procedures of flow diagram 500 can be performed while the user places the finger on the sensor, without lifting the finger. In some embodiments, the user may remove and replace the finger between each iteration.

In another embodiment, if it is determined that the quality threshold is not satisfied, flow diagram 500 proceeds to procedure 555. It should be appreciated that procedure 555 is optional. At procedure 555, in accordance with an embodiment, a failure count is incremented. It should be appreciated that the failure count is associated with an authentication session. For example, the failure count can be used to limit the number of times the quality threshold can be reduced. In some embodiments, the failure count is included within quality data that can be sent to the matcher for use in authentication. It should be appreciated that procedure 555 is optional, and that flow diagram 500 can proceed to procedure 560.

At procedure 560, it is determined whether the quality threshold is at a minimum quality threshold. For example, reducing the quality threshold may be subject to a minimum quality threshold, ensuring that the quality threshold is not reduced below a particular value, thereby ensuring that a fingerprint image of insufficient quality will not be sent to the matcher. If it is determined that the quality threshold is at the minimum value, in one embodiment, flow diagram 500 ends.

If it is determined that the quality threshold is not at the minimum value, flow diagram 500 proceeds to procedure 570. At procedure 570, the quality threshold is decreased. Flow diagram 500 then proceeds to procedure 530, where the quality of the fingerprint image is compared to the reduced quality threshold.

At procedure 590, in some embodiments, responsive to the fingerprint image being forward to the matcher for the fingerprint authentication, the quality threshold is reset. In some embodiments, the quality threshold is reset to the initial quality threshold determination made at enrollment. In other embodiments, the quality threshold is reset to a different value, e.g., an average of the initial quality threshold and the satisfied quality threshold.

It should be appreciated that, in accordance with various embodiments, that procedures 530, 540, 560, and 570 are repeated such that the quality threshold can be progressively decreased until the quality of the fingerprint image satisfies a decreased quality threshold.

Figure 6:
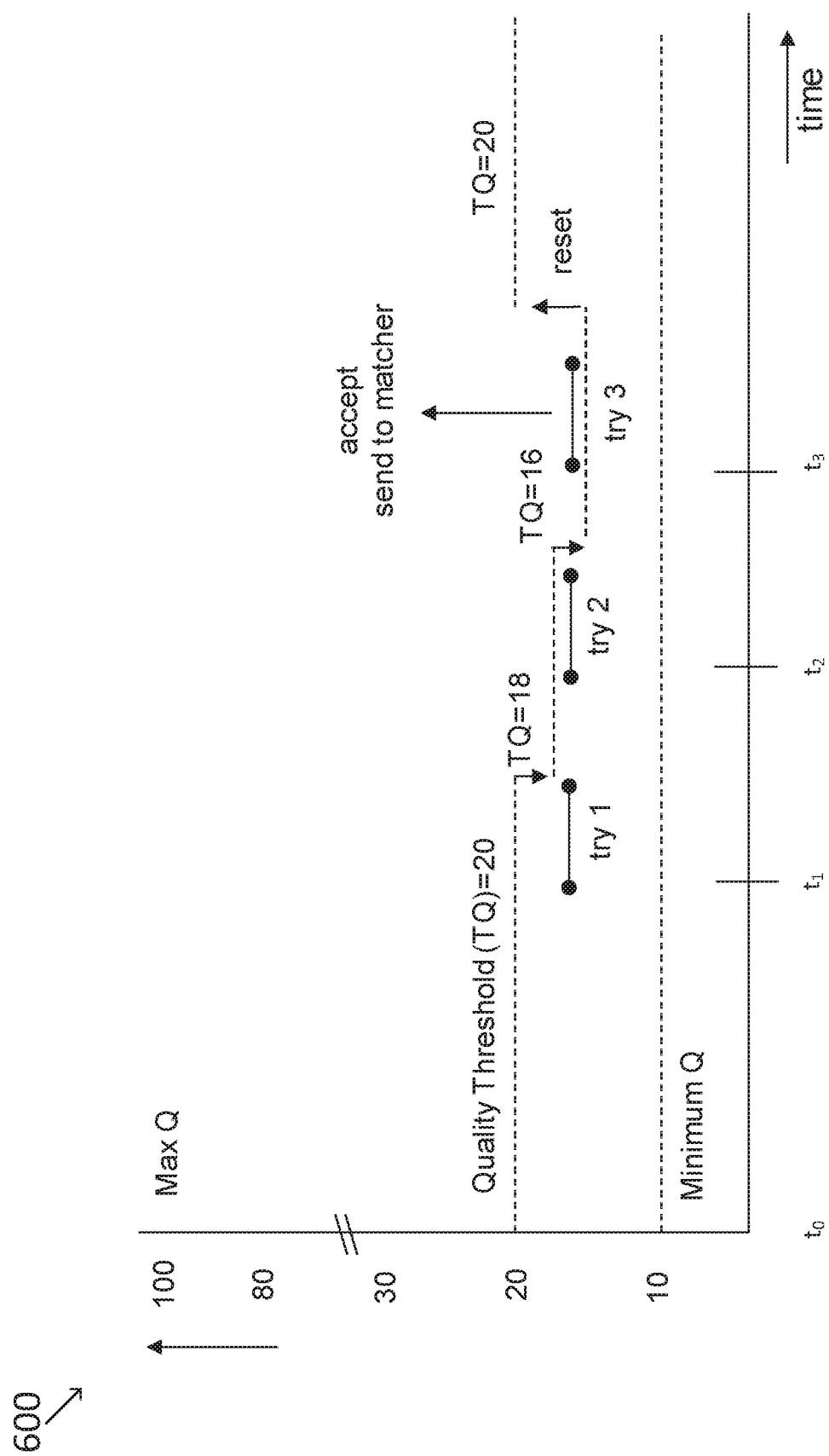
FIG. 6 illustrates a graph of an example short term adaptation of a quality threshold, according to an embodiment.

FIG. 6 illustrates a graph 600 of an example short term adaptation of a quality threshold, according to an embodiment. As illustrated, at $t_1$, authentication attempt #1 is performed at a fingerprint sensing system. The quality of the received fingerprint image is determined to have a value of 17 (within a range of 0-100) and the initial quality threshold (TQ) is 20. Since the quality of the received fingerprint image is 17, the quality threshold is not satisfied. The quality threshold is then adapted by decreasing the quality threshold from 20 to 18. In one embodiment, a failure count is incremented from zero to one.

At $t_2$, authentication attempt #2 is performed at the fingerprint sensing system. Since the quality of the received fingerprint image is 17 and the quality threshold is reduced to 18, the reduced quality threshold is not satisfied. The quality threshold is then adapted by decreasing the quality threshold from 18 to 16. In one embodiment, the failure count is incremented from one to two.

At $t_3$, authentication attempt #3 is performed at the fingerprint sensing system. Since the quality of the received fingerprint image is 17 and the quality threshold is reduced to 16, the reduced quality threshold is satisfied. The fingerprint image is sent to the matcher for authentication. The quality threshold is then reset to 20. In one embodiment, the failure count of two and the final reduced quality threshold of 16 are included in quality data also forwarded to the matcher.

Figure 7:
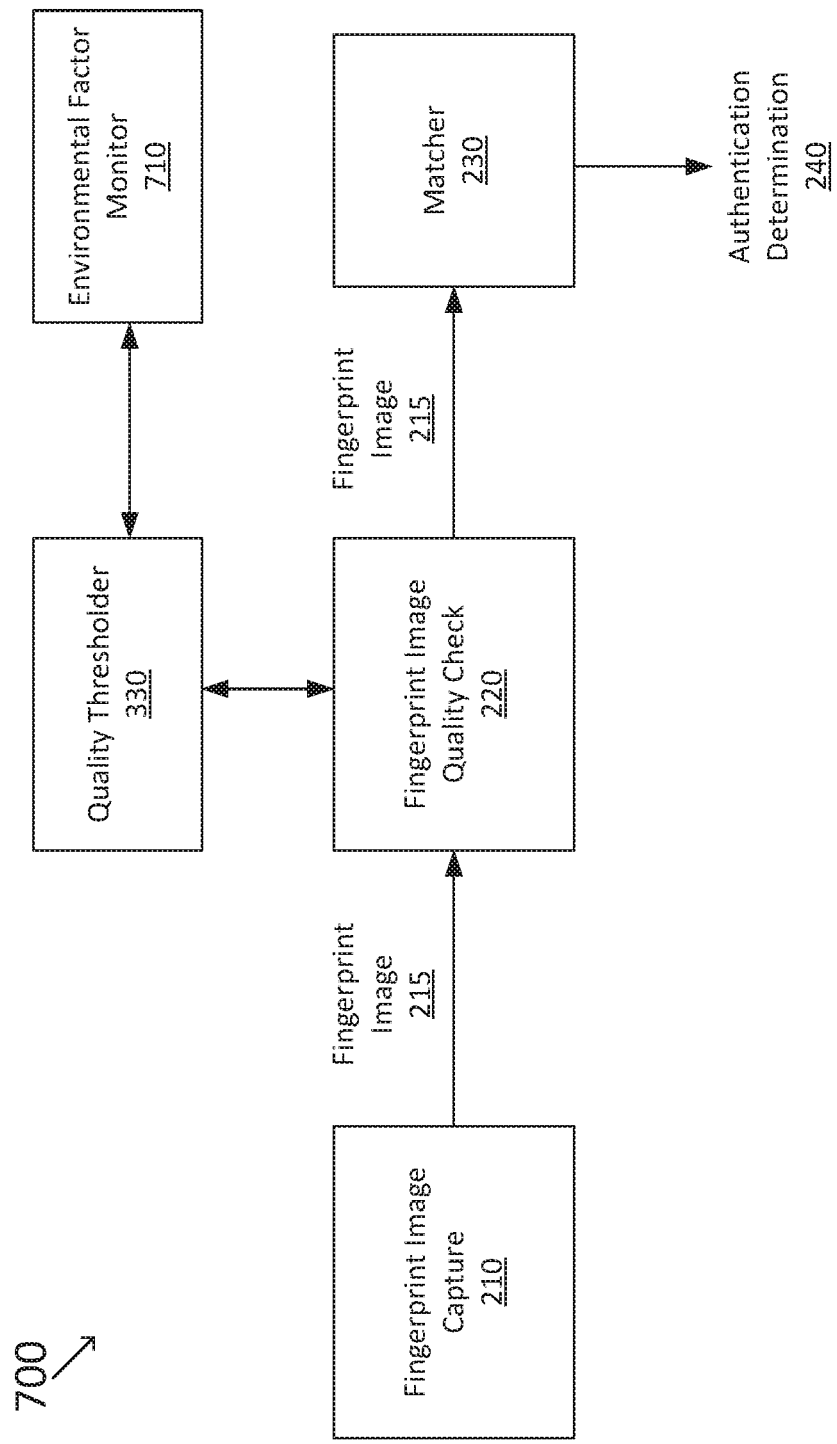
FIG. 7 illustrates a block diagram of an example system for performing long term adaptation of a quality threshold according to environmental factors, according to some embodiments.

FIG. 7 illustrates a block diagram of an example fingerprint sensing system 700 for performing long term adaptation of a quality threshold according to environmental factors, according to some embodiments. It should be appreciated that fingerprint sensing system 700 includes the components of fingerprint sensing system 200 of FIG. 2, and that like components operate in similar manner as described in accordance with the description of FIG. 2.

Fingerprint sensing system 700 includes environmental factor monitor 710 for monitoring changes or trends in environmental factors impacting an image quality of a captured fingerprint image. Different environmental factors can impact a user's fingerprint. For example, fingers may get dryer during winter months, resulting in lower image quality, with the image quality improving for the same fingers in summer months. In some embodiments, environmental factor monitor 710 monitors at least one environmental factor. It should be appreciated that the environmental factor can include, without limitation: a time of year, a time of day, a season, a location, a temperature, humidity, activity of the user, a passage of time, etc. Environmental factors may include any factor that may influence the quality of the fingerprint image. Moreover, it should be appreciated that in some embodiments the environmental factor is actively monitored (e.g., a temperature sensor or a location sensor) by the fingerprint sensing system.

Responsive to detecting a change in the environmental factor that impacts a user's fingerprint, environmental factor monitor 710 transmits an indication to quality thresholder 330 to adapt the quality threshold. In one embodiment, quality thresholder 330 adapts the initial quality threshold (e.g., the quality threshold determined based on the enrollment images). In some embodiments, responsive to receiving a fingerprint image, the initial quality threshold used during the fingerprint image quality determination operation (e.g., at flow diagram 500 of FIG. 5) is the quality threshold adapted at quality thresholder 330. It should be appreciated that the long term adaptation of the quality threshold based on environmental factors can be used in conjunction with the short term adaptation of the quality threshold described above.

Figure 8:
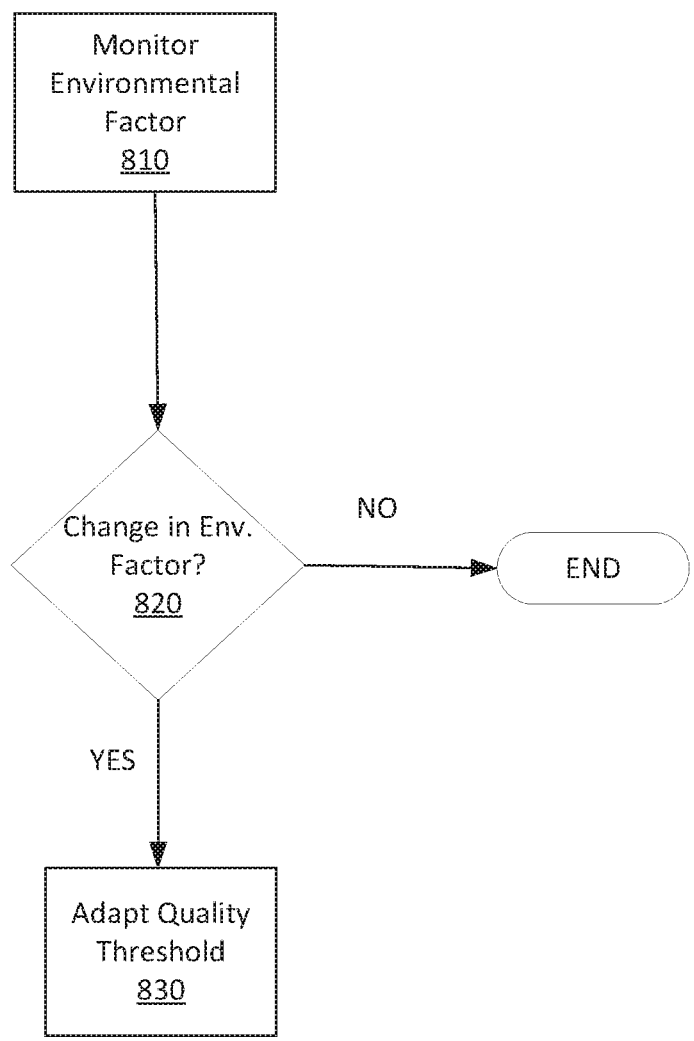
FIG. 8 illustrates an example data flow diagram of a long term adaptation of a quality threshold according to environmental factors, according to some embodiments.

FIG. 8 illustrates an example data flow diagram 800 of a long term adaptation of a quality threshold according to environmental factors, according to some embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 800 includes some procedures that, in various embodiments, are carried out by one or more processors under the control of computer-readable and computer-executable instructions that are stored on non-transitory computer-readable storage media. It is further appreciated that one or more procedures described in flow diagram 800 may be implemented in hardware, or a combination of hardware with firmware and/or software. In some embodiments, flow diagram 800 is implemented within system 700 of FIG. 7.

At procedure 810 of flow diagram 800, an environmental factor is monitored. At procedure 820, it is determined whether a change in the environmental factor impacting an image quality of a captured fingerprint image is detected. In one embodiment, the change in the environmental factor is a seasonal weather change impacting fingerprint characteristics of a user. In one embodiment, the change in the environmental factor is a temperature change impacting fingerprint characteristics of a user. For example, in colder weather the fingers get drier, and may decrease the quality of the captured fingerprint. Therefore, in one embodiment, as the temperature decreases/increases with a change in seasons, the image quality threshold may be decreased/increased. In one embodiment, the change in the environmental factor is change in geographical location impacting fingerprint characteristics of a user. If a change in the environmental factor impacting an image quality of a captured fingerprint image is not detected, flow diagram 800 ends.

If a change or trend in the environmental factor impacting an image quality of a captured fingerprint image is detected, flow diagram 800 proceeds to procedure 830. At procedure 830, a value of the quality threshold of a fingerprint image quality determination operation is adapted. In one embodiment, the quality threshold is the initial quality threshold of the short term quality threshold adaptation described above. In one embodiment, the value of the quality threshold is decreased. In another embodiment, the value of the quality threshold is increased. It should be appreciated that the determination whether to increase or decrease the quality threshold is based on the change in environmental factors. For example, during summer months the quality threshold may be higher due to better conditions for capturing high quality fingerprint images. It should be appreciated that the rate of change in the quality threshold with the change in the environmental factor may vary with the user or the geographic location of the user. The rate of change may be predefined, or may be learned by monitoring the trend of the image quality of the user (as a function of the environmental factors). Models for the rate of change may also be built using crowd sourcing and machine learning techniques.

Figure 9:
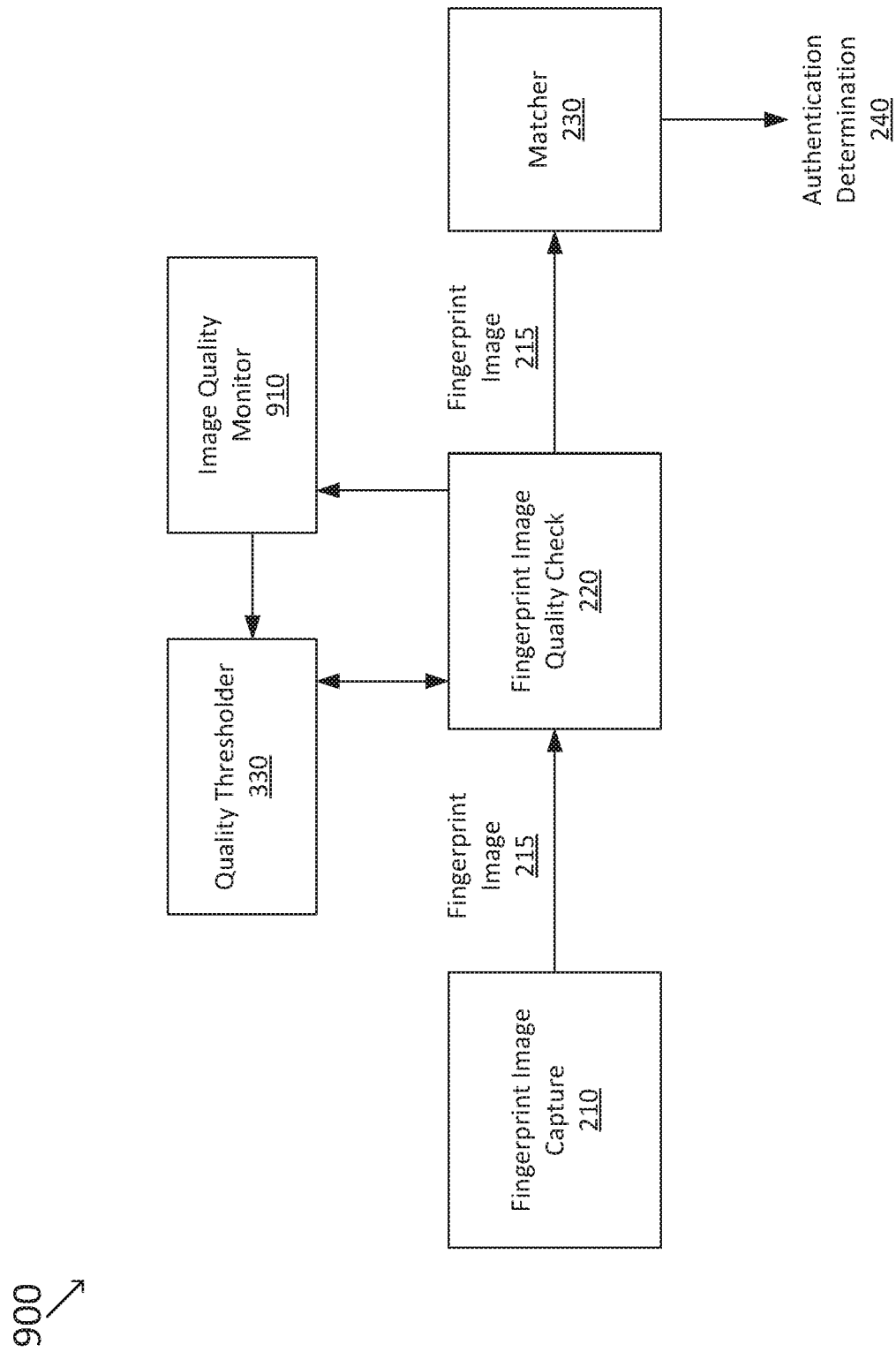
FIG. 9 illustrates a block diagram of an example system for performing long term adaptation of a quality threshold based on monitoring fingerprint image quality, according to some embodiments.

FIG. 9 illustrates a block diagram of an example fingerprint sensing system 900 for performing long term adaptation of a quality threshold based on monitoring fingerprint image quality, according to some embodiments. It should be appreciated that fingerprint sensing system 900 includes the components of fingerprint sensing system 200 of FIG. 2, and that like components operate in similar manner as described in accordance with the description of FIG. 2.

Fingerprint sensing system 900 includes image quality monitor 910 for monitoring a fingerprint image quality determination operation of the plurality of fingerprint images over a time range. Image quality monitor 910 receives the image quality for received verification images from fingerprint quality check 220 over a time range. As described above, in some embodiments, fingerprint image quality check 220 is configured to adapt a quality threshold responsive to a fingerprint image not satisfying the quality threshold. It should be appreciated that the image quality can be received from a plurality of users (e.g., crowd sourced).

Responsive to detecting a trend indicative of a change in fingerprint image quality, image quality monitor 910 transmits an indication to quality thresholder 330 to adapt the quality threshold. In one embodiment, quality thresholder 330 adapts the initial quality threshold (e.g., the quality threshold determined based on the enrollment images). In one embodiment, the value of the quality threshold is adapted according to the trend. For example, where the trend identifies a linear decline in quality over the time range, the quality threshold is decreased according to the linear trend. It should be appreciated that the trend may be in one direction, e.g., the quality of the fingerprint decrease with the age of the user, that the trend may be cyclical, e.g., depending on the seasons, and/or the trend may be associated with activities of the user, e.g., the image quality decreases due to wear on the fingertips as a results of heavy manual labor. A plurality of trends may also be combined into more complex trends. The timescale or time range of the trends may vary from hours, to weeks, months, or even years.

In some embodiments, responsive to receiving a fingerprint image, the adapted quality threshold during the fingerprint image quality determination operation (e.g., at flow diagram 500 of FIG. 5) in determining whether to forward the fingerprint image to a matcher for fingerprint authentication. It should be appreciated that the long term adaptation of the quality threshold based on environmental factors can be used in conjunction with the short term adaptation of the quality threshold described above.

Figure 10:
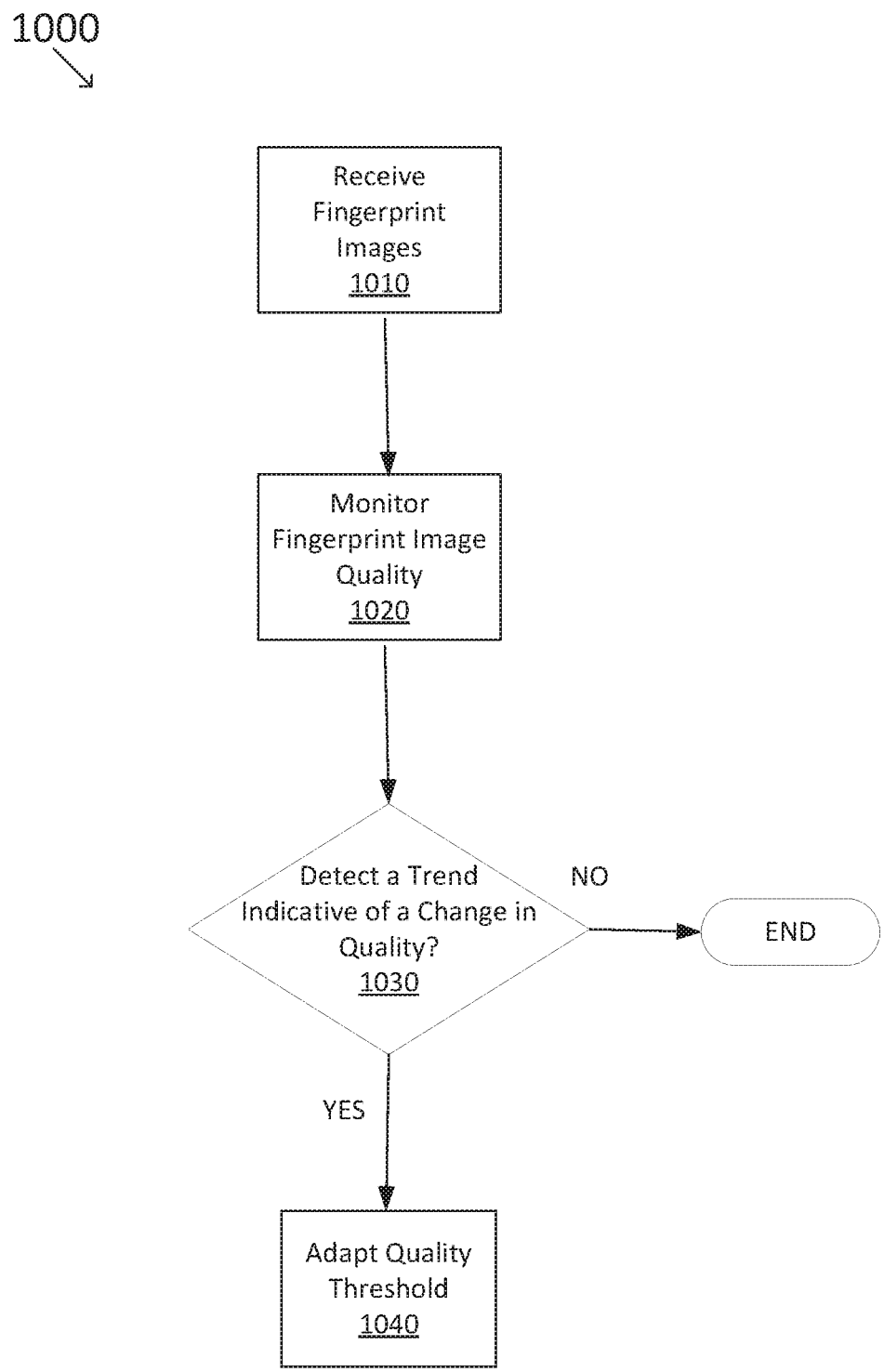
FIG. 10 illustrates an example data flow diagram of a long term adaptation of a quality threshold based on monitoring fingerprint image quality, according to some embodiments.

FIG. 10 illustrates an example data flow diagram 1000 of a long term adaptation of a quality threshold based on monitoring fingerprint image quality, according to some embodiments. Procedures of this method will be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 1000 includes some procedures that, in various embodiments, are carried out by one or more processors under the control of computer-readable and computer-executable instructions that are stored on non-transitory computer-readable storage media. It is further appreciated that one or more procedures described in flow diagram 1000 may be implemented in hardware, or a combination of hardware with firmware and/or software. In some embodiments, flow diagram 1000 is implemented within system 900 of FIG. 9.

At procedure 1010 of flow diagram 1000, a plurality of fingerprint images captured over a time range is received. In one embodiment, the plurality of fingerprint images are received from a single user. In another embodiment, the plurality of fingerprint images are received from a plurality of users (e.g., crowd sourced). At procedure 1020, a fingerprint image quality determination operation of the plurality of fingerprint images is monitored over the time range, where the fingerprint image quality determination operation is configured to adapt a quality threshold responsive to a fingerprint image not satisfying the quality threshold. At procedure 1030, it is determined whether a trend indicative of a change in image quality of the plurality of fingerprint images is detected. If a trend indicative of a change in image quality of the plurality of fingerprint images is not detected, flow diagram 1000 ends.

If a trend indicative of a change in image quality of the plurality of fingerprint images is detected, flow diagram 1000 proceeds to procedure 1040. At procedure 1040, a value of the quality threshold of a fingerprint image quality determination operation is adapted. In one embodiment, the quality threshold is the initial quality threshold of the short term quality threshold adaptation described above. In one embodiment, the value of the quality threshold is adapted according to the trend. In one embodiment, the value of the quality threshold is decreased. In another embodiment, the value of the quality threshold is increased. The principle of the adaptation is that based on the observed trend, the system predicts the expected image quality and adapts the quality threshold accordingly. This adaptation takes into considering the security aspect and system resources, as discussed above.

Figure 11:
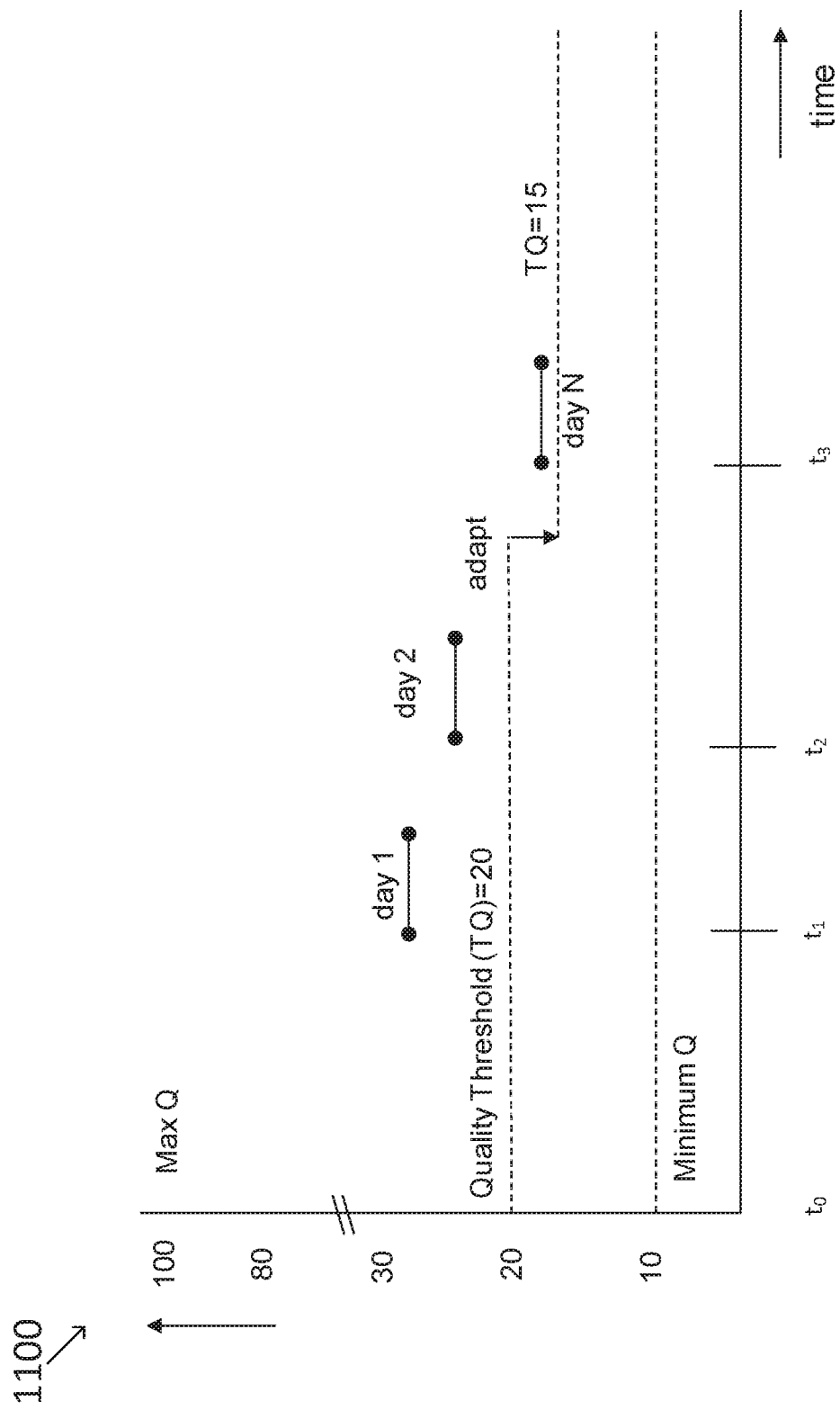
FIG. 11 illustrates a graph of an example long term adaptation of a quality threshold, according to an embodiment.

FIG. 11 illustrates a graph 1100 of an example long term adaptation of a quality threshold, according to an embodiment. As illustrated, at $t_1$, image quality for a fingerprint image received at day 1 is determined. The quality of the received fingerprint image is determined to have a value of 28 (within a range of 0-100) and the initial quality threshold (TQ) is 20. Since the quality of the received fingerprint image is 28, the quality threshold is satisfied, and no adaptation of the quality threshold is performed.

At $t_2$, image quality for a fingerprint image received at day 2 is determined. The quality of the received fingerprint image is determined to have a value of 23 (within a range of 0-100) and the initial quality threshold (TQ) is 20. Since the quality of the received fingerprint image is 23, the quality threshold is satisfied, and no adaptation of the quality threshold is performed to allow for authentication of the fingerprint image. However, there is a decreasing trend in quality of the fingerprint image. As such, subsequent $t_2$, the quality threshold is adapted to 15, in accordance with the detected trend.

At $t_3$, image quality for a fingerprint image received at day N is determined. The quality of the received fingerprint image is determined to have a value of 16 (within a range of 0-100) and the adapted quality threshold (TQ) is 15. Since the quality of the received fingerprint image is 16, the quality threshold is satisfied, and no adaptation of the quality threshold is performed. In the example shown, the quality threshold is adapted before an attempt where the quality of the captured image is below the threshold. The adaptation may be based on the trend and the quality of the captured image. In some embodiments, the quality threshold is adapted based on the trend, which in this example would mean that for day N, the threshold would already be set at 15 so that the image would be accepted and transferred to the matcher. In contrast to the example in FIG. 6, in this example, the quality threshold is not reset after the adaptation. However, in a hybrid embodiment, a partial reset of the quality threshold based on the trend may be possible. For example, the adapted quality threshold of FIG. 11 can be the initial quality threshold value for an embodiment similar to FIG. 6, whereupon the initial quality threshold value would be reset to the adapted quality threshold upon completion of the short term adaptation.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for adapting a quality threshold for a fingerprint image, the method comprising:
   performing enrollment of a user, wherein the performing the enrollment of the user comprises:
      receiving at least one enrollment image of a fingerprint of the user;
      determining quality information for the user based at least in part on the at least one enrollment image; and
      determining a quality threshold based at least in part on the quality information;
   receiving a fingerprint image;
   determining an image quality of the fingerprint image;
   provided the image quality of the fingerprint image does not satisfy the quality threshold, decreasing the quality threshold; and
   provided the image quality of the fingerprint image does satisfy a decreased quality threshold, forwarding the fingerprint image to a matcher for fingerprint authentication.

2. The method of claim 1, wherein the quality threshold is associated with an electronic device at which the fingerprint image was captured.

3. The method of claim 1, wherein the quality threshold is associated with an application.

4. The method of claim 1, further comprising:
   provided the image quality of the fingerprint image does not satisfy the quality threshold:
      changing operation of a fingerprint sensor; and
      capturing a new fingerprint image at the fingerprint sensor according to a changed operation.

5. The method of claim 1, wherein the decreasing the quality threshold comprises:
   progressively decreasing the quality threshold, wherein the quality threshold is progressively decreased until the image quality of the fingerprint image satisfies a decreased quality threshold.

6. The method of claim 5, wherein a new fingerprint image is received responsive to the decreasing the quality threshold such that the new fingerprint image is compared to a progressively decreased quality threshold.

7. The method of claim 1, wherein the quality threshold cannot be decreased below a minimum quality threshold.

8. The method of claim 1, further comprising:
   provided the image quality of the fingerprint image does not satisfy the decreased quality threshold:
      receiving a second fingerprint image;
      determining an image quality of the second fingerprint image;
      provided the image quality of the second fingerprint image does not satisfy the decreased quality threshold, decreasing the decreased quality threshold; and
      provided the image quality of the second fingerprint image does satisfy a further decreased quality threshold, forwarding the second fingerprint image to the matcher for the fingerprint authentication.

9. The method of claim 1, further comprising:
   provided the image quality of the fingerprint image does satisfy the decreased quality threshold, forwarding quality data to the matcher for use in the fingerprint authentication.

10. The method of claim 1, further comprising:
responsive to the fingerprint image being forward to the matcher for the fingerprint authentication, resetting the quality threshold.

11. A method for adaptation of a quality threshold for a fingerprint image, the method comprising:
performing enrollment of a user, wherein the performing the enrollment of the user comprises:
receiving at least one enrollment image of a fingerprint of the user;
determining quality information for the user based at least in part on the at least one enrollment image; and
determining an initial value of a quality threshold based at least in part on the quality information;
monitoring for a change in an environmental factor impacting an image quality of a captured fingerprint image;
responsive to detecting the change in the environmental factor, adapting the initial value of the quality threshold of a fingerprint image quality determination operation, wherein the adapting the initial value of the quality threshold of the fingerprint image quality determination operation comprises:
provided the environmental factor is indicative of a degradation in the image quality, decreasing the initial value of the quality threshold; and
provided the environmental factor is indicative of an increase in the image quality, increasing the initial value of the quality threshold; and
responsive to receiving a fingerprint image, using an adapted quality threshold during the fingerprint image quality determination operation in determining whether to forward the fingerprint image to a matcher for fingerprint authentication.

12. The method of claim 11, wherein the change in the environmental factor is a seasonal weather change impacting fingerprint characteristics of a user.

13. The method of claim 11, wherein the change in the environmental factor is a temperature change impacting fingerprint characteristics of a user.

14. The method of claim 11, wherein the change in the environmental factor is change in geographical location impacting fingerprint characteristics of a user.

15. A method for adaptation of a quality threshold for a fingerprint image, the method comprising:
receiving a plurality of fingerprint images captured over a time range;
monitoring a fingerprint image quality determination operation of the plurality of fingerprint images over the time range, wherein the fingerprint image quality determination operation is configured to adapt a quality threshold responsive to a fingerprint image not satisfying the quality threshold;
responsive to detecting a trend indicative of a change in image quality of the plurality of fingerprint images, adapting an initial value of the quality threshold; and
responsive to receiving a new fingerprint image, using an adapted quality threshold in determining whether to forward the fingerprint image to a matcher for fingerprint authentication.

16. The method of claim 15, wherein the adapting the initial value of the quality threshold comprises:
adapting the initial value of the quality threshold according to the trend.

17. The method of claim 15, wherein the plurality of fingerprint images are received from a plurality of users.

18. The method of claim 15, wherein the trend indicative of a change in image quality of fingerprint images are indicative of a degradation in the image quality, wherein the adapting the initial value of the quality threshold comprises:
decreasing the initial value of the quality threshold.

19. The method of claim 15, wherein the trend indicative of a change in image quality of fingerprint images are indicative of an increase in the image quality, wherein the adapting the initial value of the quality threshold comprises:
increasing the initial value of the quality threshold.

* * * * *